United States Patent [19]

Hardwick

[11] 4,074,328
[45] Feb. 14, 1978

[54] METHOD AND APPARATUS FOR RECORDING AND REPRODUCING INFORMATION ON A PLURAL-TRACK RECORD DISK

[75] Inventor: John F. Hardwick, Glenrothes, Scotland

[73] Assignee: Burroughs Corporation, Detroit, Mich.

[21] Appl. No.: 699,273

[22] Filed: June 24, 1976

[30] Foreign Application Priority Data

June 27, 1975 United Kingdom ............... 27288/75

[51] Int. Cl.² .......................... G11B 21/10; G11B 5/56
[52] U.S. Cl. ......................................... 360/77; 360/76
[58] Field of Search ...................... 360/77, 76, 78, 106, 360/135, 75, 109, 21, 71

[56] References Cited

U.S. PATENT DOCUMENTS

| | | | |
|---|---|---|---|
| 2,938,962 | 5/1960 | Konins et al. | 360/76 |
| 3,034,111 | 5/1962 | Hoagland et al. | 360/77 |
| 3,185,972 | 5/1965 | Sippel | 360/76 |
| 3,665,118 | 5/1972 | Cooper, Jr. | 360/21 |
| 3,678,220 | 7/1972 | Luhrs | 360/71 |
| 3,964,094 | 6/1976 | Hart | 360/77 |
| 4,007,493 | 2/1977 | Behr et al. | 360/76 |

Primary Examiner—Alfred H. Eddleman
Attorney, Agent, or Firm—Gerald J. Woloson; Benjamin J. Barish; Kevin R. Peterson

[57] ABSTRACT

A transducer track-centering system for a magnetic information storage disk utilizes the data itself to generate position-correcting error signals. Angularly-disposed magnetic gaps in a two-part transducer head read and write the data in identical components of a V-shaped pattern which straddles the center line of the disk record track. Transducer positioning errors take the form of a time lag between the data read from the separate branches of the V. The time-difference is then used to adjust the transducer position perpendicularly with respect to track center.

10 Claims, 9 Drawing Figures

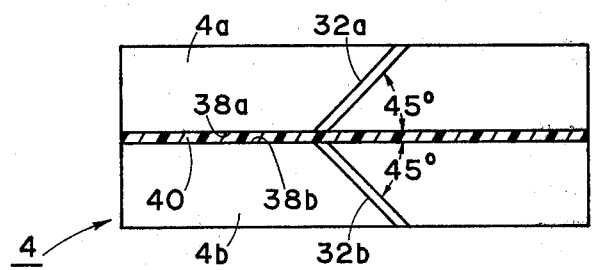
Fig. 6
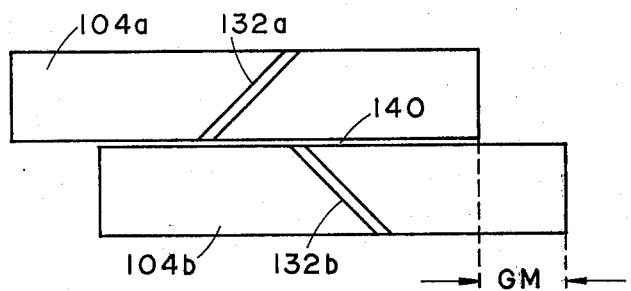
Fig. 7
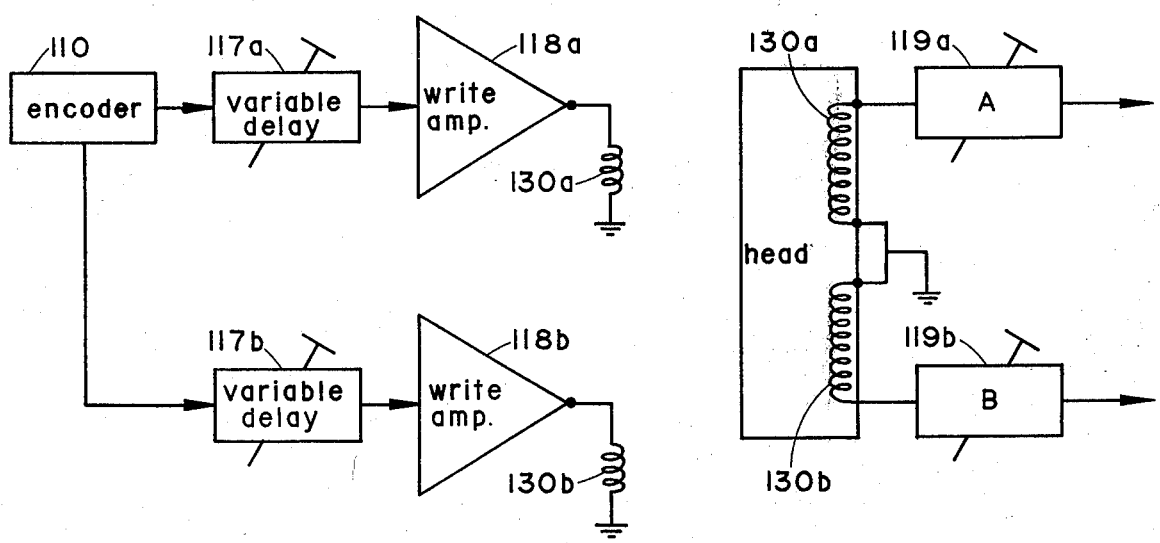
Fig. 8
Fig. 9

METHOD AND APPARATUS FOR RECORDING AND REPRODUCING INFORMATION ON A PLURAL-TRACK RECORD DISK

BACKGROUND OF THE INVENTION

1. Field of the Invention

The present invention relates to a method and apparatus for recording and reproducing information on a plural-track record disk. The invention is particularly directed to a technique for increasing the capacity of a disk to store data by enabling the data to be recorded along a plurality of closely-spaced, concentric circular tracks on the record disk.

2. Description of the Prior Art

Plural-track magnetic disks of the "flying-head" type are commonly used for recording retreivable informational data in computers and other data processing systems. A factor limiting the track density, and therefore the disk capacity, is the precision with which the head can be positioned with respect to a selected track. This is particularly true when the disk is recorded on one unit and played-back on another unit, or when parts of a disk are recorded or played-back on different units. Positional inaccuracies arise from "drift" or other cumulative causes, such as wear and distortion with time and use of mechanical parts; thermal effects both after switch-on and during use, such as those arising because of temperature coefficient variations relative to the frame and disk; humdity variations, particularly in the case of flexible disks; and spindle eccentricity of one unit relative to another unit.

The "open loop" technique for positioning the head with respect to a selected track, in which the head is moved a measured distance from a reference point on the frame, does not compensate for the above positional inaccuracies. Systems have been proposed including specially-written tracks, or "dedicated tracks", which convey information concerning magnitude and direction of the displacement of the reading head from the track center or axis. Such systems, however, require that a substantial recording surface be allocated to the specially-written or dedicated tracks for purposes of conveying the positional information, and therefore they substantially reduce the surface of the record disk available for recording the retreivable informational data. In addition, such dedicated tracks convey directly their own positions, and only indirectly the position of the data tracks, and therefore do not completely compensate for possible variations between the two arising from the above-discussed positional inaccuracies.

SUMMARY OF THE INVENTION

An object of the present invention is to provide a novel method and apparatus for recording and reproducing retrievable information on a plural-track record disk in order to increase the track density and thereby the disk capacity.

According to one aspect of the present invention, there is provided a method of recording and reproducing retrievable informational data with respect to a selected one of a plurality of circular concentric tracks on a record disk, comprising: selecting a track on which the data is to be recorded; positioning with respect thereto transducer means including two recording-reproducing devices fixed at a predetermined angle to each other, the two devices being positioned at opposite sides of the center line of the selected track and at equal acute angles with respect thereto; utilizing both said recording-reproducing devices concurrently for recording said data so that the same data is recorded in two angular zones with respect to the center line of the selected track; utilizing both recording-reproducing devices concurrently for reading out said so-recorded data from the angular zones of the selected track; outputting the data from one of the recording-reproducing devices to an output device; detecting any difference in the time that the outputted data is read-out from the one recording-reproducing device and the time that the same data is read-out from the other recording-reproducing device; producing an error signal corresponding to said time difference; and utilizing said error signal to move the transducer means with respect to the center line of the selected track in the direction tending to reduce the error signal to zero.

In the preferred embodiment of the invention described below, the two recording-reproducing devices are fixed with respect to each other to record the data as chevron-shaped transitions.

According to another aspect of the invention, there is also provided apparatus for recording and reproducing retrievable informational data with respect to a selected one of a plurality of circular concentric tracks on a record disk, comprising: track selector means for selecting the track on which the data is to be recorded; transducer means including two recording-reproducing devices fixed at a predetermined angle to each other; a transducer drive for moving the transducer means radially of the record disc to locate the two recording-reproducing devices at opposite sides of the axis of the selected track and at equal acute angles with respect thereto; data input means for inputting the data to be recorded to both said recording-reproducing devices concurrently for recording the same data in two angular zones with respect to the center line of the selected track; data read-out means for reading-out said so-recorded data by means of both recording-reproducing devices concurrently from the two angular zones along the selected track; data output means for outputting to an output device the data from one of said recording-reproducing devices; detector means for detecting any difference between the time that the data is outputted from said one recording-reproducing device and the time the same data is outputted from the other recording-reproducing device, and for producing an error signal corresponding to said time difference; and correcting means for moving the transducer means with respect to the center line of the selected track in the direction tending to reduce the error signal to zero.

In the preferred embodiment of the invention described below, the record disk is a magnetic disk, and the two recording-reproducing devices are magnetic recording and preproducing heads.

According to a further feature the two magnetic recording and reproducing heads are included in a single magnetic head unit having a pair of magnetic gaps fixed 90° to each other to a V-formation, whose apex is to be aligned with the center line of the selected track, the magnetic head unit including a coil for each gap.

It will thus be seen that in the method and apparatus of the present invention, the retreivable informational data itself is used as the target for a head-positioning servo loop. This greatly increases the capacity of the disk for storing the informational data since it enables substantially the complete recording surface of the disk to be used and at the same time it reduces the possibility of positional inaccuracies so that the data may be recorded in a very high track-density manner.

Further features and advantages of the invention will be apparent from the description below.

BRIEF DESCRIPTION OF THE DRAWINGS

The invention is herein described, by way of example only, with reference to a preferred embodiment as illustrated in the accompanying drawings, wherein:

FIG. 6 diagramatically illustrates how the head of FIG. 2 may be constructed;

FIG. 7 illustrates how a gap misalignment may occur in the construction of the magnetic head of FIG. 6;

And FIGS. 8 and 9 illustrate circuit arrangements that may be used for correcting gap misalignment in the input circuit and output circuit, respectively, of the apparatus of FIG. 1.

DESCRIPTION OF A PREFERRED EMBODIMENT

Figure 1:
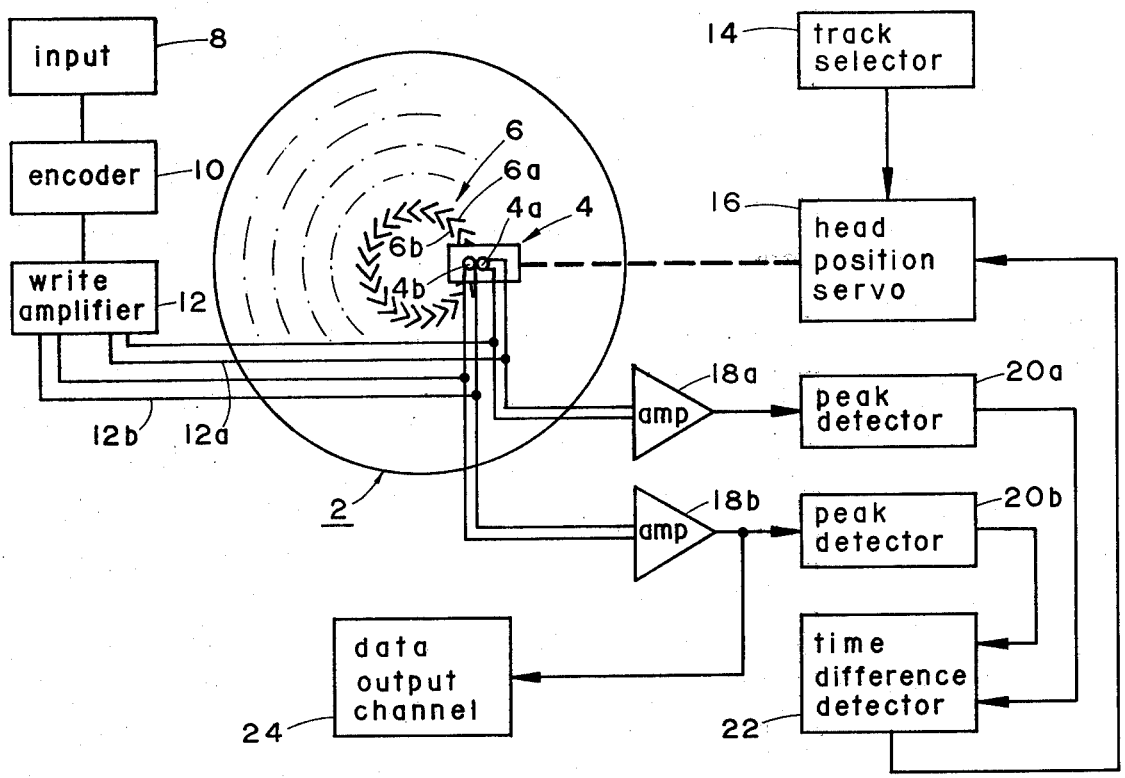
FIG. 1 is a diagram illustrating one form of apparatus constructed in accordance with the present invention.

With reference to FIG. 1 illustrating the overall apparatus, there is shown a plural-track magnetic recording disc 2 mounted for rotation with respect to a recording-reproducing unit 4 including two magnetic heads fixed to each other so as to record the data as chevron-shaped flux transitions 6. The data is inputted via an input circuit 8, coded in encoder circuit 10, and then amplified in Write amplifier 12 before being fed to the reproducing heads in unit 4. Write amplifier 12 includes one output 12a feeding one head 4a, and a second output 12b feeding the second head 4b.

It will thus be seen that the same data inputted, encoded and amplified, is supplied concurrently to both recording heads, 4a, 4b, the data from one head 4a being recorded as one leg 6a of the chevron-shaped flux transitions, and the data from the other head 4b being recorded as the second leg thereof.

A track selector 14 selects the track on which the data is to be recorded. The signal representing the selected track is fed to a head-position servo 16, which positions the head unit 4 in accordance with the selected track.

When the data previously recorded on the disc 2 is to be reproduced, the data itself is used for targeting the head-positioning servo drive 16 to align the head 4 exactly along the center-line of the selected track, this center-line passing through the apices of the chevron-shape flux transitions 6. Thus, head 4a of unit 4, reading the data from leg 6a of the chevron-shaped magnetic patterns, feeds the data via a Read amplifier 18a to a peak detector 20a; and head 4b, reading the data from leg 6b, feeds that data via a Read amplifier 18b to another peak detector 20b. The apparatus further includes a time difference detector 22, which detects the difference in time between peaks from the two detectors 20a, 20b, and produces an error signal corresponding to this time difference. This error signal is fed to the head-positioning servo drive 16 causing the latter to correct the position of the transducer head by moving same with respect to the center-line of the selected track in the direction tending to reduce the error signal to zero.

The information recorded in the selected track is outputted via one of the two Read amplifiers, in this case amplifier 18b, to the normal data output channel 24.

Figure 2:
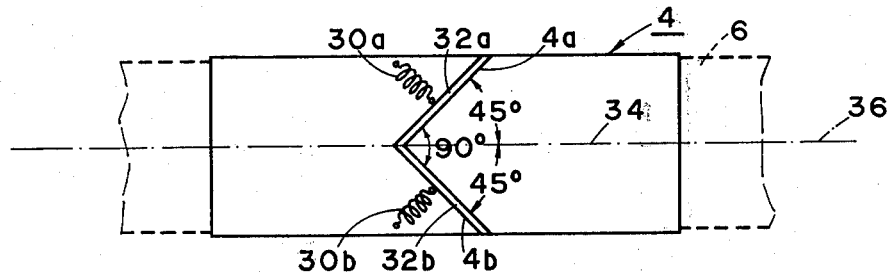
FIG. 2 illustrates the magnetic recording-reproducing head used in the apparatus of FIG. 2.
Figure 3:
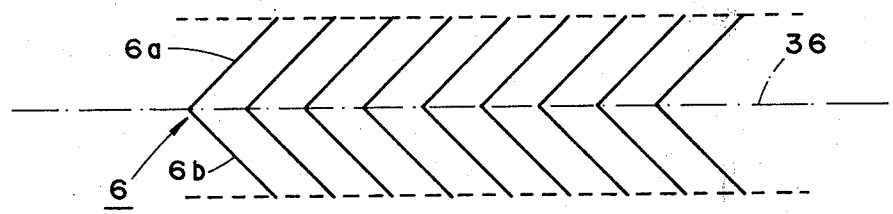
FIG. 3 illustrates the recording pattern of magnetic flux transitions produced when using the head of FIG. 2.

The recording-reproducing unit 4 is more particularly illustrated in FIG. 2, and the chevron-shaped flux transitions produced by its 2 heads are illustrated in FIG. 3. As shown in FIG. 2, head 4a includes a coil 30a and a magnetic gap 32a; and head 4b includes a coil 30b and a magnetic gap 32b. The two magnetic gaps, 32a, 32b, are at 90° to each other, and each is 45° to the center line 34 through the head unit 4.

It will thus be seen from FIG. 3 that gap 32a records the data along leg 6a of the chevron-shaped flux transitions 6, and gap 32b records the data along leg 6b, the two legs being at 90° to each other, and each leg being at 45° to the center-line 36 passing through the apices of the chevron-shaped pattern 6. This center-line 36 constitutes the center line of the selected track on the record disc.

FIGS. 4a–4c and 5a–5c illustrate how any deviation in the position of the recording-reproducing heads 4a, 4b with respect to the center line 36 of the selected track from which the data is to be reproduced, is sensed and is used for correcting the position of the head. Thus, if in reading the information from a chevron-shaped track 6, the head unit 4 is correctly positioned with respect to the center-line 36 of the selected track, gap 32a of head 4a will read out the information from its respective leg 6a of the recorded pattern exactly at the same time that gap 32b of head 4b reads out the information from its respective leg 6b of the recorded pattern. Accordingly, there will be no difference in the time the data from the two legs 6a, 6b are read-out, this being shown in FIG. 4a and FIG. 5a. The error signal produced by the time difference detector 22 will therefore be zero, requiring no correction of the head-position servo drive 16.

Figures 4A, 4B, 4C:
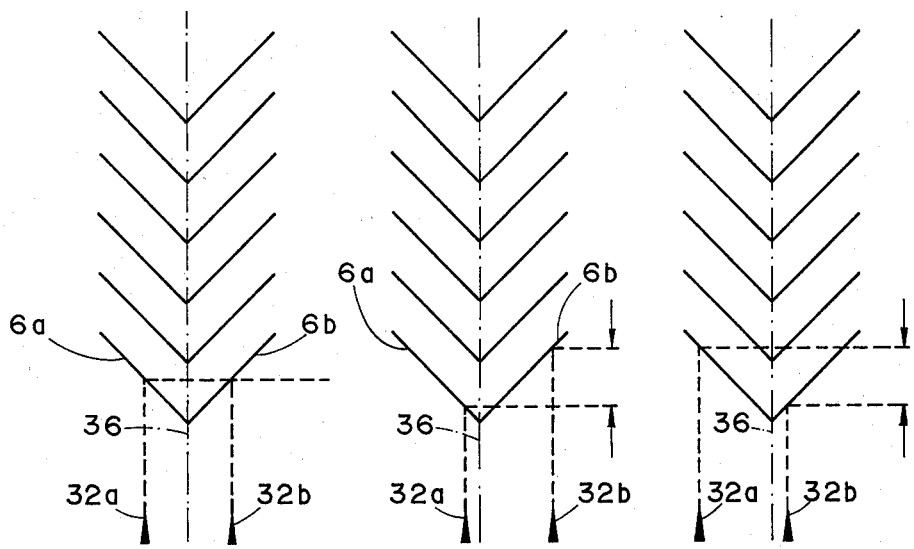
FIGS. 4a, 4b, 4c illustrate how the deviation in the magnetic recording pattern is used for correcting the position of the recording-reproducing head.
Figures 5A, 5B:
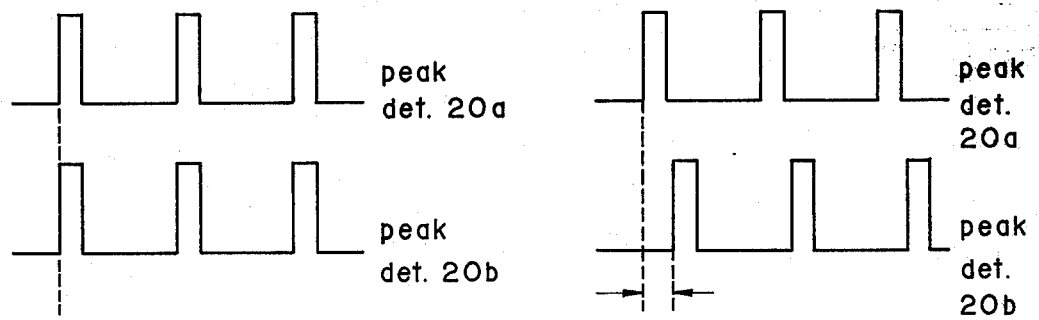
FIGS. 5a, 5b, and 5c are timing diagrams related to the magnetic recording patterns of FIGS. 4a, 4b, and 4c, respectively.

On the other hand, if the head unit 4 is not correctly positioned with respect to the center-line 36 of the selected track, the gap of one of the heads 4a, 4b will sense the data in its respective leg of the recorded pattern before the gap of the other head. FIGS. 4b and 5b illustrate the condition wherein gap 32a senses the data from its leg 6a before gap 32b senses the data from its leg 6a. In such a case, the output of the respective peak detectors 20a, 20b will not coincide, whereby the time difference detector 22 will produce an error signal corresponding to the difference in time between the peaks. This error signal is fed to the head position servo drive 16 to move the head unit 4 in the direction tending to reduce the error signal to zero, at which time the head unit will be precisely in position with respect to the center line 36 of the selected track.

Figure 5C:
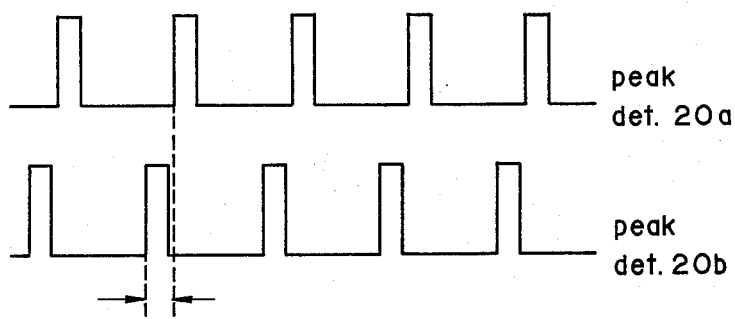

FIGS. 4c and 5c illustrate the condition wherein the head unit 4 is positioned such that gap 32b senses the data from its respective leg 6b, before gap 32a senses the data from its leg 6a, the operation of the apparatus being the same as described above except that the error signal produced by the time difference detector 22 will cause the head position servo drive 16 to move the head in the opposite direction in order to reduce the error signal to zero, whereupon the head will be exactly aligned with the center line of the selected track.

FIG. 6 illustrates how the head unit 4 may be constructed. Preferably, it is constructed of two halves each constituting one of the heads 4a, 4b, and each including the respective magnetic gap 32a, 32b. Each half is formed with a flat face, 38a, 38b, with the respective gap being exactly at a 45° angle to that flat face, and the two halves are joined together along the latter faces by bonding material 40. Thus, the two gaps 32a, 32b should intersect at line 40 along which the two halves of the unit are bonded together, line 40 passing through the apex of the chevron-shaped configuration formed by the two gaps and serving as the center-line of the head unit.

This is a very convenient and inexpensive way of producing head unit 4, but there will always be some error in aligning the two gaps. FIG. 7 illustrates how this error results, the error being greatly exaggerated for purposes of clarity. Thus, it will be seen that if head-half 104a is not bonded exactly to head-half 104b at the point where both gaps 132a, 132b intersect the center line 140 of the combined head unit, namely the surface at which the two halves are bonded, a gap mis-alignment (of value GM) will result.

The misalignment between the two magnetic gaps may be easily compensated for by the apparatus itself. This is shown in FIG. 8 illustrating the read-in circuit to the respective heads. Encoder 110 receiving this data is provided with two outputs, one being fed via a variable delay circuit 117a to the Write amplifier 118a of the coil 130a of one head and a second output being fed via another variable delay circuit 117b to the Write amplifier 118b of the coil 130b of the second head. Thus, the variable delays 117a, 117b can be adjusted during the read-in of the data to compensate for any gap misalignment.

FIG. 9 illustrates the arrangement that may be used for compensating for gap misalignment during read-out. Thus, as shown in FIG. 9, wherein it will be seen that each coil 130a, 130b is provided with a variable delay device 119a, 119b interposed in the read-out circuit. FIG. 9 shows the variable delays interposed between the coils and their Read amplifiers, but it will be appreciated that they could be provided following the amplifiers or at other locations in the read-out circuit.

Many other variations, modifications and applications of the illustrated embodiment will be apparent.

What is claimed is:

1. A transducer track-centering method utilizing a direct sensing of data position for reproducing retrievable informational data with respect to a selected one of a plurality of circular concentric tracks on a record disk, comprising: selecting a track on which the data is to be recorded; positioning with respect thereto transducer means including two recording-reproducing devices fixed at a predetermined angle to each other, the two devices being positioned at opposite sides of the center line of the selected track and at equal acute angles with respect thereto; utilizing both said recording-reproducing devices concurrently for recording said data so that the same data is recorded in two angular zones with respect to the center line of the selected track; utilizing both recording-reproducing devices concurrently for reading-out said so-recorded data from the angular zones of the selected track; outputting the data from one of the recording-reproducing devices to an output device; detecting any difference in the time that the outputted data is read-out from the one recording-reproducing device and the time that the same data is read-out from the other recording-reproducing device; producing an error signal corresponding to said time difference; and utilizing said error signal to move the transducer means in a substantially perpendicular direction with respect to the center line of the selected track in the direction tending to reduce the error signal to zero.

2. The method according to claim 1, wherein said record disk is a magnetic disk, and said two recording-reproducing devices magnetically record the data on the selected track of the record disk.

3. The method according to claim 2, wherein the two recording-reproducing devices are fixed with respect to each other to record the data as chevron-shaped transitions.

4. A transducer track-centering apparatus utilizing a direct sensing of data position for reproducing retrievable informational data with respect to a selected one of a plurality of circular concentric tracks on a record disk, comprising: track selector means for selecting the track on which the data is to be recorded; transducer means including two recording-reproducing devices fixed at a predetermined angle to each other; a transducer drive for moving the transducer means radially of the record disk to locate the two recording-reproducing devices at opposite sides of the axis of the selected track and at equal acute angles with respect thereto; data input means for inputting the data to be recorded to both said recording-reproducing devices concurrently for recording the same data in two angular zones with respect to the center line of the selected track; data read-out means for reading-out said so-recorded data by means of both recording-reproducing devices concurrently from the two angular zones along the selected track; data output means for outputting to an output device the data from one of said recording-reproducing devices; detector means for detecting any difference between the time that the data is outputted from said one recording-reproducing device and the time the same data is outputted from the other recording-reproducing device, and for producing an error signal corresponding to said time difference; and correcting means for moving the transducer means in a substantially perpendicular direction with respect to the center line of the selected track in the direction tending to reduce the error signal to zero.

5. Apparatus according to claim 4, wherein the record disk is a magnetic disk, and the two recording-reproducing devices are magnetic recording and reproducing heads.

6. Apparatus according to claim 5, wherein said two recording-reproducing devices are fixed with respect to each other to record the data as chevron-shaped flux transitions.

7. Apparatus according to claim 6, wherein said two magnetic recording and reproducing heads are included in a single magnetic head unit having a pair of magnetic gaps fixed 90° to each other in a V-formation, whose apex is to be aligned with the center line of the selected track, the magnetic head unit including a coil for each gap.

8. Apparatus according to claim 7, wherein the single magnetic head unit is constructed of two halves each formed with a gap of 45° to one face of the respective half, the two halves being joined together along said one face.

9. Apparatus according to claim 8, further including means for compensating for any misalignment between the two magnetic gaps during the read-in, said compensating means comprising a variable delay device between the data input means and the coil for each gap.

10. Apparatus according to claim 9, further including means for compensating for any misalignment between the two magnetic gaps during the read-out of the data, said latter compensating means comprising a variable delay device between the coil for each gap and the data output device.

* * * * *

UNITED STATES PATENT OFFICE
CERTIFICATE OF CORRECTION

Patent No. 4,074,328      Dated Feb. 14, 1978

Inventor(s) John Frederick Hardwick

It is certified that error appears in the above-identified patent and that said Letters Patent are hereby corrected as shown below:

Col. 3, Line 14, Patent reads Fig. 2. Should be Fig. 1

Signed and Sealed this

Thirtieth Day of January 1979

[SEAL]

Attest:

RUTH C. MASON
Attesting Officer

DONALD W. BANNER
Commissioner of Patents and Trademarks